(12) United States Patent
Wang et al.

(10) Patent No.: US 6,239,242 B1
(45) Date of Patent: May 29, 2001

(54) VINYLAROMATIC AND OLEFIN PSEUDOBLOCK POLYMERS

(75) Inventors: Qinyan Wang; Patrick Lam, both of Calgary (CA)

(73) Assignee: Nova Chemicals Corporation, Calgary (CA)

( * ) Notice: Subject to any disclaimer, the term of this patent is extended or adjusted under 35 U.S.C. 154(b) by 0 days.

(21) Appl. No.: 09/379,149

(22) Filed: Aug. 21, 1999

(51) Int. Cl.$^7$ ................................................. C08F 236/10
(52) U.S. Cl. .................... 526/347; 526/126; 526/127; 526/131; 526/134; 526/160; 526/161; 526/170; 526/293; 526/340; 525/268; 525/321; 525/323; 525/324
(58) Field of Search ...................... 526/126, 127, 526/131, 134, 160, 161, 170, 293, 340, 347; 525/268, 321, 323, 324

(56) References Cited

U.S. PATENT DOCUMENTS

| | | |
|---|---|---|
| 3,390,141 | 6/1968 | Richards . |
| 3,478,129 | 11/1969 | Kern et al. . |
| 4,762,893 * | 8/1988 | Nocci et al. ...................... 525/324 X |
| 5,153,157 | 10/1992 | Hlatky et al. . |
| 5,324,800 | 6/1994 | Welborn, Jr. et al. . |
| 5,703,187 | 12/1997 | Timmers . |
| 6,114,481 * | 9/2000 | McMeeking et al. ........... 526/901 X |

FOREIGN PATENT DOCUMENTS

| | | |
|---|---|---|
| WO 98/09999 | 3/1998 | (WO) . |
| WO 00/78831 A1 | 12/2000 | (WO) . |

* cited by examiner

Primary Examiner—Fred Teskin
(74) Attorney, Agent, or Firm—Kenneth H. Johnson

(57) ABSTRACT

There are a number of recent developments relating to co- and homo-polymers of vinyl aromatic monomers. There are syndiotactic polymers of styrene, there are pseudo random polymers of styrene and ethylene. The present invention seeks to provide novel pseudoblock polymers of styrene and ethylene in which at least 10 weight % of the vinyl aromatic monomer is incorporated in the form of one or more atactic pseudoblocks.

9 Claims, 2 Drawing Sheets

VINYLAROMATIC AND OLEFIN PSEUDOBLOCK POLYMERS

FIELD OF THE INVENTION

The present invention relates to copolymers of one or more $C_{2-10}$ alpha olefins with one or more $C_{8-10}$ vinyl aromatic monomers, which polymers are atactic pseudoblock polymers.

BACKGROUND OF THE INVENTION

Polymers of one or more alpha olefins are generally incompatible with polymers of one or more $C_{8-10}$ vinyl aromatic monomers. As a result, it is difficult to blend or even laminate, for example, polystyrene and polyethylene. There have been a number of attempts to prepare copolymers of, for example styrene and ethylene. Such polymers could lead to two different developments. The copolymer might have the properties sought after in the blend or the copolymer may be a suitable compatibilizer so that the blend could be prepared.

U.S. Pat. No. 3,390,141 issued Jun. 25, 1968, assigned to the Shell Oil Company teaches a block copolymer of styrene and ethylene containing from 0.01 to 7 weight % of styrene block polymerized in the presence of a conventional Ziegler-Natta polymerization system. The patent teaches that the styrene is not incorporated into the ethylene backbone of the polymer but rather tends to be in styrene blocks at the end of the olefin homopolymer (Col. 2 lines 55–60).

U.S. Pat. No. 3,478,129 issued Nov. 11, 1969, assigned to Monsanto Company teaches a block polymer of styrene and ethylene. The polymer consists of blocks of crystallizable polystyrene blocks and blocks of polyethylene or atactic ethylene styrene copolymer. The polymerization process uses a conventional Ziegler-Natta catalyst and does not contemplate the process of the present invention.

U.S. Pat. No. 5,703,187 issued Dec. 30, 1997, assigned to the Dow Chemical Company teaches pseudo random co-polymers of styrene and ethylene. The patent teaches that the distinguishing feature of all pseudo random copolymers is the fact that all phenyl or bulky hindering groups substituted on the polymer backbone are separated by 2 or more methylene units. The polymers of the present invention are distinct over the polymers of the patent in that the polymers of the present invention comprise at least 10 weight % of the vinyl aromatic monomer in the form of one or more atactic pseudoblocks. Additionally the process for preparing such polymers uses a catalyst distinct from that disclosed in the reference.

WO 98/09999 filed by the Dow Chemical Company claims a different structure of an ethylene styrene copolymer. The reference teaches that the styrene in the styrene ethylene tetrad is inserted exclusively in the head to tail manner. The patent teaches away from blocks of more than two styrene monomer units.

There are a number of Idemitsu Kosan Co. Ltd. patents which teach polymers comprising blocks of syndiotactic polystyrene (the phenyl rings are alternating on opposite sides of the back bone) and the olefin is incorporated in repeating units (e.g. olefin blocks). The patent teaches blocks of syndiotactic polystyrene and does not suggest the atactic pseudoblock polystyrene of the present invention. Additionally, the process for preparing the block copolymers does not use the catalyst system contemplated by the present invention.

The present invention seeks to provide a polymer comprising one or more alpha olefins and one or more atactic pseudoblocks of polystyrene.

SUMMARY OF THE INVENTION

The present invention provides a pseudoblock polymer comprising from 90 to 50 weight % of one or more $C_{2-8}$ alpha olefins and from 10 to 50 weight % of one or more $C_{8-12}$ vinyl aromatic monomers which are unsubstituted or substituted by one or more substituents selected from the group consisting of a chlorine or bromine atom and a $C_{1-4}$ alkyl radical wherein at least 10 weight % of the total $C_{8-12}$ vinyl aromatic monomers incorporated in the polymer is in the form of one or more atactic pseudoblocks.

The present invention further provides a process for preparing a pseudoblock polymer according to claim 1, comprising contacting a monomer mixture comprising from 90 to 50 weight % of one or more $C_{2-8}$ alpha olefins and from 10 to 50 weight % of one or more $C_{8-12}$ vinyl aromatic monomers which are unsubstituted or substituted by one or more substituents selected from the group consisting of a chlorine or bromine atom and a $C_{1-4}$ alkyl radical, in the presence of an inert hydrocarbon diluent and an organometallic complex is defined by the formula I:

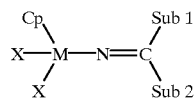

wherein M is selected from Ti and Zr; Cp is a cyclopentadienyl-type ligand; each of said X is a non-interfering ligand; and each of said Sub 1 and Sub 2 is independently selected from the group consisting of $C_{1-20}$ hydrocarbyl radicals, silyl radicals, amido radicals and phosphido radicals

DETAILED DESCRIPTION

Figure 1:
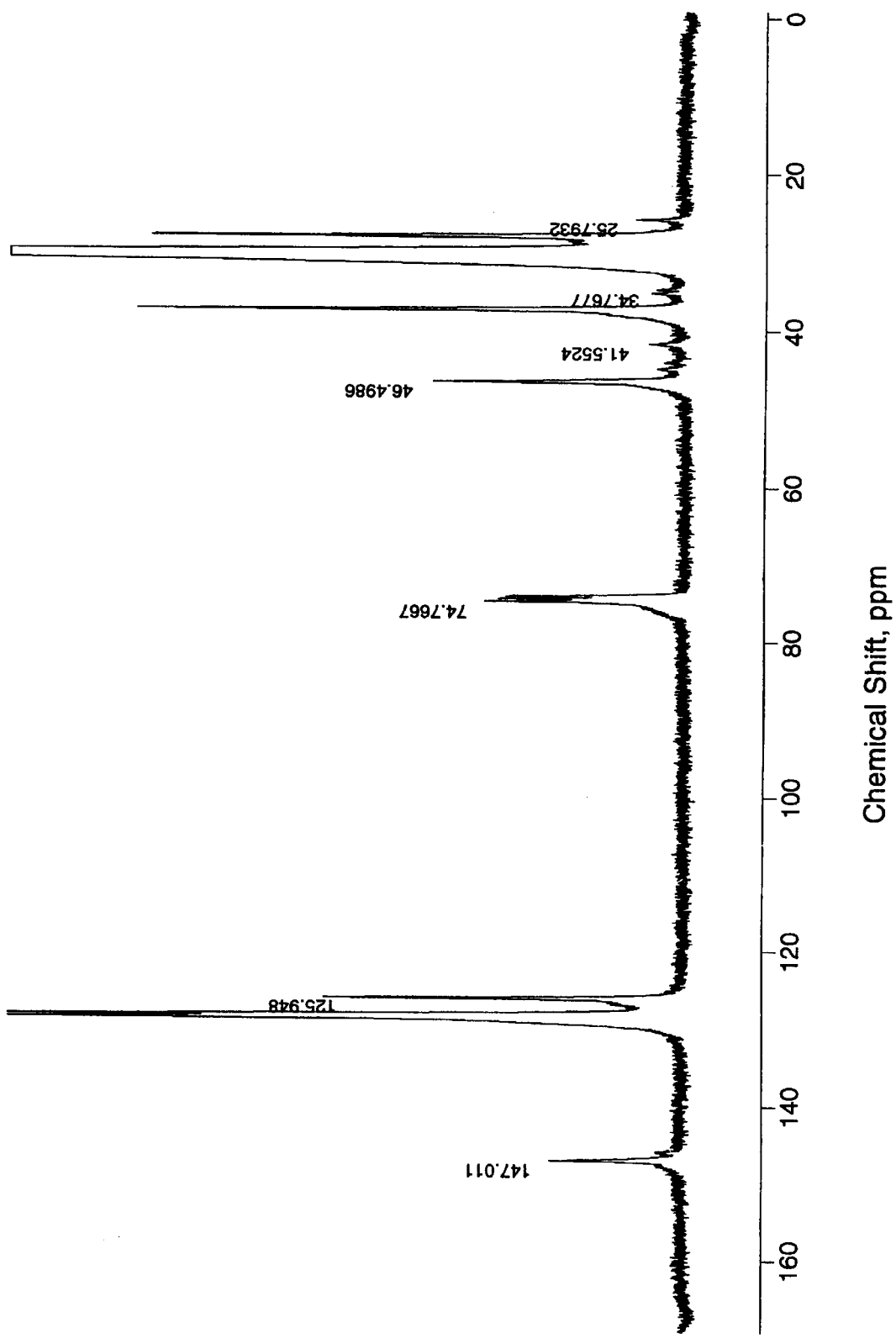
FIG. 1 is a $^{13}C$ NMR of the ethylene styrene copolymer produced according to example 1.
Figure 2:
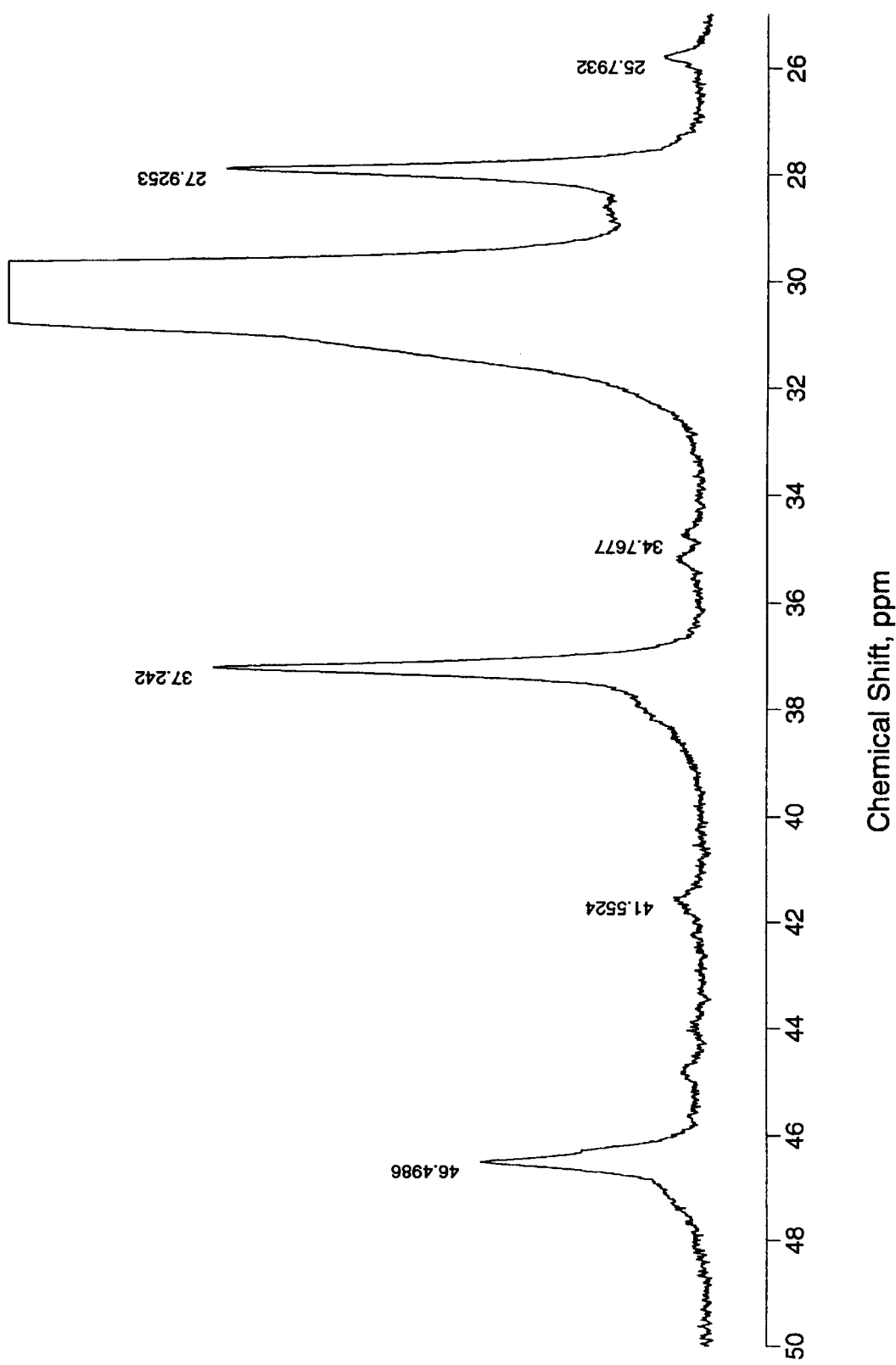
FIG. 2 is an expanded section of the NMR of FIG. 1 at a chemical shift between 26 and 50 ppm.

As used in the present specification, pseudoblock polymers means polymer containing at least three consecutive polymerized vinyl aromatic monomer units. Generally three consecutive polymerized vinyl aromatic monomer units may be identified by $^{13}C$ NMR.

The present invention relates to pseudoblock polymers of one or more $C_{2-8}$ alpha olefins and one or more $C_{8-10}$ vinyl aromatic monomers which are unsubstituted or substituted by a $C_{1-4}$ alkyl radical. Suitable olefin monomers include ethylene, propylene, butene, hexene and octene. Generally only one olefin monomer is used, preferably ethylene but in some instances the olefin monomer may be a combination of about 90 weight % of ethylene and up to 10 weight % of a monomer selected from the group consisting of propylene, butene, hexene and octene. The vinyl aromatic monomer may be selected from the group consisting of styrene, alpha methyl styrene and p-methyl styrene.

The polymers of the present invention generally comprise from 90 to 50, preferably from 80 to 60 weight % of olefin and from 10 to 50, preferably from 20 to 40 weight % of vinyl aromatic monomer. In the polymers of the present invention at least 10 weight % of the total vinyl aromatic monomer incorporated in the polymer chain is in the form of one or more atactic (e.g. the phenyl groups are randomly arranged along the back bone of the block of vinyl aromatic polymer) pseudo-block poly $C_{8-10}$ vinyl aromatic polymers and the balance is in the form of a co-polymer with the olefin monomer.

Additionally, the polymers of the present invention may optionally contain from 0 up to about 10 weight % of one or more $C_{4-6}$ conjugated diolefin monomers such as 1,3-butadiene and isoprene. If present, preferably the conjugated diolefin is 1,3-butadiene.

The presence of a block of vinyl aromatic polymer may be detected using NMR by a $^{13}C$ peak between 41 to 44 ppm.

The relative ratios of block polymer to co-polymer may be determined by integrating the peaks of the NMR over the appropriate ranges.

An alternate method is to carry out a solvent extraction on the resulting polymer.

Both of the foregoing methods are more fully described in the experimental section of this specification.

The polymers of the present invention may be prepared by solution or slurry polymerization of the monomers in the presence of a ketimide catalyst. The polymerization may take place at temperatures from about 20° C. to about 250° C., preferably from about 80° C. to about 120° C. and at pressures from about 15 psi up to about 5,000 psi, preferably from about 100 psi to about 4500 psi.

The polymerization may be conducted in the presence of an inert solvent or diluent. Suitable solvents or diluents are hydrocarbons having from about 5 to 12 carbon atoms or mixtures thereof. These compounds include pentane, hexane, heptane, octane, cyclohexane, methylcyclohexane, benzene, toluene, and hydrogenated naphtha. A commercially available hydrocarbon is ISOPAR® E (a $C_{5-12}$ aliphatic solvent sold by EXXON Chemical Co.).

As used herein, the term "ketimide ligand" refers to a ligand which:

a) is bonded to the group 4 metal via a metal-nitrogen atom bond;

b) has a single substituent on the nitrogen atom (where this single substituent is a carbon atom which is doubly bonded to the N atom); and c) has two substituents (Sub 1 and Sub 2, described below) which are bonded to the carbon atom.

Conditions a, b and c are illustrated below:

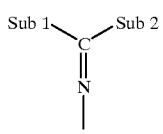

The substituents "Sub 1 and Sub 2" may be the same or different. Exemplary substituents include hydrocarbyls having from 1 to 20 carbon atoms, silyl groups, amido groups and phosphido groups. For reasons of cost and convenience it is preferred that these substituents both be hydrocarbyls, especially simple alkyls and most preferably tertiary butyl.

In the preferred catalyst systems, the catalyst is defined by the formula:

$L_1$ is the ketimide ligand defined above. $L_2$ is a cyclic ligand which forms a delocalized pi-bond with the group 4 metal. $L_2$ is preferably a cyclopentadienyl-type ligand. As used herein, the term cyclopentadienyl-type is meant to convey its conventional meaning and to include indenyl and fluorenyl ligands. The simplest (unsubstituted) cyclopentadiene, indene and fluorene structures of the ligands (before attachment to the metal) are illustrated below.

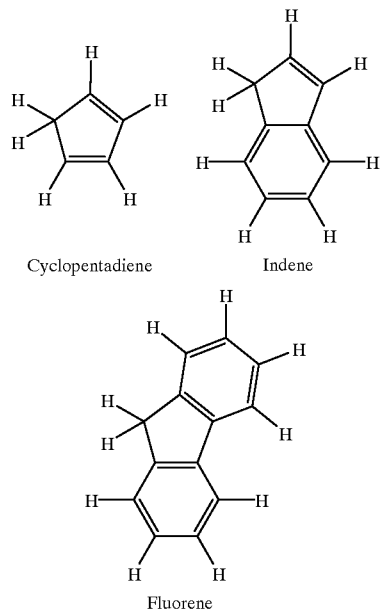

Cyclopentadiene    Indene

Fluorene

Ligands in which one of the carbon atoms in the ring is replaced with a phosphorous atom (i.e. a phosphole) may also be employed.

It will be readily appreciated by those skilled in the art that the hydrogen atoms shown in the above formula may be replaced with substituents to provide the "substituted" analogues. Thus, the preferred catalysts contain a cyclopentadienyl structure which may be an unsubstituted cyclopentadienyl, substituted cyclopentadienyl, unsubstituted indenyl, substituted indenyl, unsubstituted fluorenyl or substituted fluorenyl. A description of permissible substituents on these cyclopentadienyl-type structures is provided in U.S. Pat. No. 5,324,800 (Welbom).

An illustrative list of such substituents for cyclopentadienyl groups includes $C_{1-20}$ hydrocarbyl radicals; substituted $C_{1-20}$ hydrocarbyl radicals wherein one or more hydrogen atoms is replaced by a halogen radical, an amido radical, a phosphido radical, an alkoxy radical or a radical containing a Lewis acidic or basic functionality; substituted $C_{1-20}$ hydrocarbyl radicals wherein the substituent contains an atom selected from the group 14 or 15 of the Periodic Table of Elements (where group 14 refers to IUPAC nomenclature) (preferably silicon or nitrogen); and halogen radicals, amido radicals, phosphido radicals, alkoxy radicals, alkyborido radicals or a radical containing Lewis acidic or basic functionality; or a ring in which two adjacent R-groups are joined forming a $C_{1-20}$ ring to give a saturated or unsaturated polycyclic ligand.

Ligand X: "Non-lnterfering Anionic Ligand"

Referring to formula I, the preferred catalyst system according to this invention contains two simple anionic ligands denoted by the letter X.

Any simple anionic ligand which may be bonded to an analogous metallocene catalyst component (i.e. where the analogous metallocene catalyst component is defined by the formula $Cp_2M(X)_2$, where Cp is a cyclopentadienyl-type ligand; M is a group 4 metal; and X is a non-interfering ligand as defined herein) may also be used with the catalyst components of this invention.

"Non-interfering" means that this ligand does not interfere with (deactivate) the catalyst.

An illustrative list includes hydrogen, a hydrocarbyl having up to 10 carbon atoms, halogen, amido and phosphido (with each X preferably being chlorine, for simplicity).

The polymerization process of this invention is conducted in the presence of a catalyst and an "activator or cocatalyst". The terms "activator" or "cocatalyst" may be used interchangeably and refer to a catalyst component which combines with the organometallic complex to form a catalyst system that is active for olefin polymerization.

Preferred cocatalysts are the well know alumoxane (also known as aluminoxane) and ionic activators.

The term "alumoxane" refers to a well known article of commerce which is typically represented by the following formula:

$$R_2'AlO(R'AlO)_m AlR_2'$$

where each R' is independently selected from alkyl, cycloalkyl, aryl or alkyl substituted aryl and has from 1–20 carbon atoms; and where m is from 0 to about 50 (especially from 10 to 40). The preferred alumoxane is methylalumoxane or "MAO" (where each of the R' is methyl).

Alumoxanes are typically used in substantial molar excess compared to the amount of metal in the catalyst. Aluminum:transition metal molar ratios of from 10:1 to 10,000:1 are preferred, especially from 50:1 to 500:1.

Another type of activator is the "ionic activator" or "substantially non-coordinating anion". As used herein, the term substantially non-coordinating anions ("SNCA") are well known cocatalyst or activator systems which are described, for example, in U.S. Pat. No. 5,153,157 (Hlatky and Turner), and the carbonium, sulfonium and oxonium analogues of such activators which are disclosed by Ewen in U.S. Pat. No. 5,387,568. In general, these SNCA form an anion which only weakly coordinates to a cationic form of the catalyst.

While not wanting to be bound by theory, it is generally believed that SNCA-type activators ionize the catalyst by abstraction or protonation of one of the "X" ligands (non-interfering ligands) so as to ionize the group 4 metal center into a cation (but not to covalently bond with the group 4 metal) and to provide sufficient distance between the ionized group 4 metal and the activator to permit a polymerizable olefin to enter the resulting active site. It will be appreciated by those skilled in the art that it is preferable that the "non-interfering" ("X") ligands be simple alkyls when using a SNCA as the activator. This may be achieved by the alkylation of a halide form of the catalyst.

Examples of compounds capable of ionizing the group 4 metal complex include the following compounds:

triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl) boron,
N,N-dimethylanilinium tetra( phenyl)boron,
N,N-diethylanilinium tetra(phenyl) boron,
N,N-diethylanilinium tetra(phenyl)n-butylboron,
N,N-2,4,6-pentamethylanilinium tetra(phenyl)boron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene (diazonium) tetrakispentafluorophenyl borate,
tropillium phenyltrispentafluorophenyl borate,
triphenylmethylium phenyltrispentafluorophenyl borate,
benzene (diazonium) phenyltrispentafluorophenyl borate,
tropillium tetrakis (2,3,5,6-tetrafluorophenyl) borate,
triphenylmethylium tetrakis (2,3,5,6-tetrafluorophenyl) borate,
benzene (diazonium) tetrakis (3,4,5-trifluorophenyl) borate,
tropillium tetrakis (3,4,5-trifluorophenyl) borate,
benzene (diazonium) tetrakis (3,4,5-trifluorophenyl) borate,
tropillium tetrakis (1,2,2-trifluoroethenyl) borate,
triphenylmethylium tetrakis (1,2,2-trifluoroethenyl) borate,
benzene (diazonium) tetrakis (1,2,2-trifluoroethenyl) borate,
tropillium tetrakis (2,3,4,5-tetrafluorophenyl) borate,
triphenylmethylium tetrakis (2,3,4,5-tetrafluorophenyl) borate, and
benzene (diazonium) tetrakis (2,3,4,5-tetrafluorophenyl) borate.

Readily commercially available activators which are capable of ionizing the group 4 metal complexes include:

N,N-dimethylaniliniumtetrakispentafluorophenyl borate, ("[Me$_2$NHPh][B(C$_6$F$_5$)$_4$]");
triphenylmethylium tetrakispentafluorophenyl borate ("[Ph$_3$C][B(C$_6$F$_5$)$_4$]"); and
trispentafluorophenyl boron.

These SNCA activators are typically used in approximately equimolar amounts (based on the group 4 metal in the catalyst) but lower levels may also be successful and higher levels also generally work (though sub-optimally with respect to the cost-effective use of the expensive activator).

In addition to the catalyst and cocatalyst, the use of a "poison scavenger" may also be desirable. As may be inferred from the name "poison scavenger", these additives may be used in small amounts to scavenge impurities in the polymerization environment. Aluminum alkyls, for example triisobutyl aluminum, are suitable poison scavengers. (Note: Some caution must be exercised when using poison scavengers as they may also react with, and deactivate, the catalyst.)

The resulting polymer is then recovered and separated from the solvent and then devolatilized using conventional techniques.

The present invention will now be illustrated by the following non-limiting examples in which unless otherwise specified parts means parts by weight (e.g. grams) and % means weight per cent.

Polymerization Results

All the solution polymerization experiments described below were conducted using a 500 mL Autoclave Engineers Zipperclave reactor. All the chemicals (solvent, styrene, catalyst and cocatalyst) were fed into the reactor batchwise except ethylene which was fed on demand. No product was removed during the polymerization reaction. As are known to those skilled in the art, all the feed streams were purified prior to feeding into the reactor by contact with various absorption media to remove catalysts killing impurities such as water, oxygen, sulfur and polar materials. All components were stored and manipulated under an atmosphere of purified argon or nitrogen. The reactor uses a programmable logic control (PLC) system with Wonderware 5.1 software for the process control. Ethylene and styrene copolymerizations were performed in the reactor equipped with an air driven stirrer and an automatic temperature control system.

Polymerization reactions were conducted at 120° C. or 90° C. in cyclohexane. The polymerization time varied from 25 to 70 minutes for each experiment. The reaction was terminated by adding 5 mL of methanol to the reactor. The polymer was recovered by evaporation of the cyclohexane or by drying it in vacuum. The polymerization activities were calculated based on the weight of the polymer produced. Before submission of any analysis, we conducted an extraction experiment to remove atactic polystyrene in the system. Using this extraction procedure, the ES with higher styrene content was also removed. Raw ES refers to ES polymer generated directly from the reactor without any treatment. The raw ES sample may contain homopolymers of aPS and PE. The raw ES polymer recovered did not contain homopolymer PE as identified by DSC (no typical PE melting point).

As it is well known in the art, aPS dissolves easily in $CH_2Cl_2$, even at room temperature. After the ES polymers were extracted, the soluble fraction contained aPS and ES with higher styrene content, whereas the insoluble fraction contained ES polymer. The analytical data reported herein is based on insoluble fraction of ES sample.

The Extraction Procedure

1) Grind ES sample through a 20 mesh screen.
2) Weigh out 3 g of sample.
3) Extract in Soxhlet apparatus with 300 mL $CH_2Cl_2$ for 7.5 hours.
4) Dry Soxhiet in vacuum oven at 50° C. overnight.
5) Filter solvent and evaporate solvent in fumehood.
6) Collect both soluble and insoluble fractions.

The following table indicates the reproducibility of this extraction procedure.

TABLE 1

Reproducibility of the Extraction on ES Produced with $CpTiNCtBu_2Cl_2$/PMAO-IP

| Material | Extraction % | Total wt % Styrene | SSS wt % |
|---|---|---|---|
| Raw ES | No | 36.9 | 64.1 |
| ES soluble fraction 1 | 31.2 | 64.6 | 92.7 |
| ES insoluble fraction 1 | 68.8 | 23.9 | 10.4 |

TABLE 1-continued

Reproducibility of the Extraction on ES Produced with $CpTiNCtBu_2Cl_2$/PMAO-IP

| Material | Extraction % | Total wt % Styrene | SSS wt % |
|---|---|---|---|
| ES insoluble fraction 2 | 62.7 | 25.2 | 10.2 |
| ES insoluble fraction[1] | 68.9 | 28.2 | 12.7 |
| Statistic analysis | 66.8 ± 8.8[2] | 25.8 ± 5.5[2] | 11.1 ± 3.4[2] |

[1]This data was collected from a different batch of ES polymer, which ran under the identical polymerization conditions.
[2]This expression is for 95.0% confidence interval.

$[CPh_3][B(C_6F_5)_4]$ was purchased from Asahi Glass Inc.; lot #: 980224. PMAO-IP was purchased from Akzo-Nobel and contained 13.5 weight % of Al. Styrene was purchased from Aldrich and passed through an inhibitor removal column, then purified over $CaH_2$.

PMAO-IP scavenger solution was prepared by dissolving 0.7 mL of PMAO-IP in 10 mL of toluene.

DSC was conducted on a DSC 220 C from Seiko Instruments. The heating rate is 10° C./min from 0 to 200° C.

FT-IR was conducted on a Nicolet Model 750 Magna IR spectrometer.

Determination of Styrene Content and Triad Sequence Distribution for Ethylene-Styrene Copolymers by $^{13}C\{^1H\}$-NMR The total styrene content and triad sequence distribution of the ethylene-styrene copolymers were determined by using 200 MHz Bruker AC-200 or 300 MHz Bruker DPX-300 NMR spectrometer. About 20–30 weight % of the polymer was added into 1,2,4-trichlorobenzene and the $^{13}C$ NMR of the resulting polymer solution was ran at 125° C. where 4000 to 8000 scans were acquired in the spectrum. In most experiments, the NMR spectrometer was operated under the following conditions: 50.32 MHz for AC-200 NMR or 75 MHz for DPX-300 NMR, unlocked operation mode, 90 degree pulse width, 10 seconds recycle delay and broadband or composite pulse decoupling.

The ESE triad was derived from $\alpha\delta$ $CH_2$ at 37.2 ppm, $\beta\delta$ $CH_2$ at 27.9 ppm and CH at 46.5 ppm provided there was no interference from other peaks at 46.5 ppm. The ESE triad was calculated on the basis of the $\beta\beta$ $CH_2$ resonance at 25.8 ppm. The SSE triad which was the multiple tail to tail styrene insertion, was indicated by the doublet at 35.1 ppm and 34.7 ppm. The SSS sequence was derived from the methine resonance between 41 and 42 ppm.

The total styrene content was calculated by normalizing the integral at 125 ppm with respect to the backbone carbons, which were defined as the sum of the integral at 25.8 ppm, 27.9 ppm, 30.0 ppm, 34.7 to 35.1 ppm and 42 to 47 ppm. The amount of SSS sequence in the polymer (atactic pseudoblock aPS) was expressed as the percentage by weight of the total styrene content.

POLYMERIZATIONS

Example 1

$CpTiNCtBu_2Cl_2$ and PMAO-IP for ethylene and styrene solution copolymerization at 120° C. (molar ratio of styrene/ethylene=4/1).

Cyclohexane (216 mL) was transferred into the reactor along with 27 mL of styrene. The solution was heated to 120° C. and saturated with 100 psig of ethylene. PMAO-IP (19.4 mmol, 4.4 mL) was injected into the reactor. One minute later, the CpTiNCtBu$_2$Cl$_2$ (64.8 umol, 21.2 mg) was dissolved in 12 mL of toluene and injected into the reactor. The polymerization reaction occurred immediately with an increase in reaction temperature. After 70 minutes, the reaction was terminated with 5 mL of methanol. The resulting polymer was dried. Yield=11.0 g. Activity=144.4 g polymer/mmolcat*hr. 21.1% of the ES polymer was extracted. m.p.=82.9° C. SSS=0.7; SSE=0.3; ESE=4.0; SES=0.5; EEE=94.4. The total styrene incorporated in the polymer was 28.8 weight % and atactic pseudoblock aPS is 12.7%.

COMPARATIVE EXAMPLES

Example 2

(NPtBu3)$_2$TiMe$_2$ and [CPh$_3$][B(C$_6$F$_5$)$_4$] for ethylene and styrene solution copolymerization at 90° C. (molar ratio of styrene/ethylene=4/1)

Cyclohexane (216 mL) was transferred into the reactor along with 27 mL of styrene and 1 mL toluene solution of PMAO-IP as a scavenger. The solution was heated to 90° C. and saturated with 70 psig of ethylene. The catalyst (NPtBu3)$_2$TiMe$_2$ (25.9 umol, 13.3 mg) was dissolved in toluene (11.8 mL) and transferred into a catalyst injection bomb. The cocatalyst [CPh$_3$][B(C$_6$F$_5$)$_3$] (27.2 umol, 24.8 mg) was dissolved in toluene (12.4 mL) and loaded into a cocatalyst injection bomb. The catalyst and cocatalyst were injected into the reactor simultaneously. The polymerization reaction occurred immediately and reached 1 05.5° C. within 10 seconds and back to the setting temperature within 5 minutes. After 23 minutes, the reaction was terminated with 5 mL of methanol. The resulting polymer was dried. Yield= 49.4 g. Activity=4949.6 g polymer/mmolcat*hr. 53.3% of the ES polymer was extracted using the cold extraction (3 g of raw ES polymer was ground and meshed (20 mesh) and then treated with 300 mL CH$_2$Cl$_2$ for 2 hours with stirring). SSS=1.2; SSE=1.7; ESE=13.2; SES=13.6; EEE=70.3. The total styrene incorporated in the polymer is 57.3 weight % and atactic pseudoblock aPS is 4%.

Example 3

[CPh$_3$][B(C$_6$F$_5$)$_4$] for ethylene and styrene solution copolymerization at 90° C. (molar ratio of styrene/ethylene=4/1).

Cyclohexane (216 mL) was transferred into the reactor along with 27 mL of styrene and 1 mL toluene solution of PMAO-IP as a scavenger. The solution was heated to 90° C. and saturated with 70 psig of ethylene. The cocatalyst [CPh$_3$][B(C$_6$F$_5$)$_3$] (27.2 umol, 24.8 mg) was dissolved in toluene (12.4 mL) and loaded into a cocatalyst injection bomb. The catalyst and cocatalyst were injected into reactor simultaneously. The polymerization reaction occurred immediately and reached 95° C. within 10 seconds and back to the setting temperature within 2 minutes. After 15 minutes, the reaction was terminated with 5 mL of methanol. The resulting polymer was dried. Yield=16.0 g of aPS. The 300 mg of the product was dissolved in the 30 mL of CH$_2$Cl$_2$.

What is claimed is:

1. A pseudoblock polymer comprising from 90 to 50 weight % of one or more C$_{2-8}$ alpha olefins and from 10 to 50 weight % of one or more C$_{8-12}$ vinyl aromatic monomers which are unsubstituted or substituted by one or more substituents selected from the group consisting of a chlorine atom, a bromine atom and a C$_{1-4}$ alkyl radical wherein at least 10 weight % of the total C$_{8-12}$ vinyl aromatic monomers incorporated in the polymer is in the form one or more atactic pseudo-blocks.

2. The pseudoblock polymer according to claim 1, wherein said C$_{2-8}$ alpha olefin is selected from the group consisting of ethylene, propylene, butene, hexene and octene.

3. The pseudoblock polymer according to claim 2, wherein said C$_{8-12}$ vinyl aromatic monomer is selected from the group consisting of styrene, alpha methyl styrene and p-methyl styrene.

4. The pseudoblock polymer according to claim 3, further comprising from 0 to 10 weight % of a C$_{4-6}$ conjugated diolefin.

5. The pseudoblock polymer according to claim 4, wherein said conjugated diolefin is 1,3 butadiene.

6. A process for preparing a pseudoblock polymer according to claim 1, comprising contacting a monomer mixture comprising from 90 to 50 weight % of one or more C$_{2-8}$ alpha olefins and from 10 to 50 weight % of one or more C$_{8-12}$ vinyl aromatic monomers which are unsubstituted or substituted by one or more substituents selected from the group consisting of a chlorine atom, a bromine atom and a C$_{1-4}$ alkyl radical, in the presence of an inert hydrocarbon diluent and an organometallic complex defined by the formula:

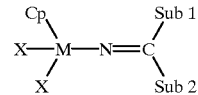

wherein M is selected from Ti and Zr; Cp is a cyclopentadienyl-type ligand; each of said X is a non-interfering ligand; and each of said Sub 1 and Sub 2 is independently selected from the group consisting of C$_{1-20}$ hydrocarbyl radicals, silyl radicals, amido radicals and phosphido radicals and an activator at a temperature from 25° C. to 250° C.

7. The process according to claim 6, wherein said M is titanium, said Cp is a cyclopentadienyl ligand; each of said Sub 1 and Sub 2 is a tertiary butyl radical; and each of said X is selected from the group consisting of a halogen atom and a methyl radical.

8. The process according to claim 7, wherein each X is a chlorine atom.

9. The process according to claim 8, wherein the temperature is from 80° to 120° C.

* * * * *